United States Patent
Ramsey et al.

(10) Patent No.: US 7,367,011 B2
(45) Date of Patent: Apr. 29, 2008

(54) METHOD, SYSTEM AND PROGRAM PRODUCT FOR DEVELOPING A DATA MODEL IN A DATA MINING SYSTEM

(75) Inventors: Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 10/825,404

(22) Filed: Apr. 13, 2004

(65) Prior Publication Data

US 2005/0228767 A1    Oct. 13, 2005

(51) Int. Cl.
*G06F 9/44* (2006.01)
*G06F 7/00* (2006.01)

(52) U.S. Cl. .............. 717/104; 717/114; 717/116; 717/117; 707/100; 707/102

(58) Field of Classification Search ........ 717/104–119; 707/100–200
See application file for complete search history.

(56) References Cited

U.S. PATENT DOCUMENTS

| | | | |
|---|---|---|---|
| 6,014,670 A | 1/2000 | Zamanian et al. | |
| 6,339,775 B1 | 1/2002 | Zamanian et al. | |
| 6,587,857 B1 | 7/2003 | Carothers et al. | |
| 6,594,672 B1 * | 7/2003 | Lampson et al. | 707/103 R |
| 6,604,110 B1 | 8/2003 | Savage et al. | |
| 7,107,280 B2 * | 9/2006 | Tomic et al. | 707/102 |
| 2002/0038450 A1 | 3/2002 | Kloppmann et al. | |
| 2002/0083067 A1 * | 6/2002 | Tamayo et al. | 707/100 |
| 2002/0107858 A1 * | 8/2002 | Lundahl et al. | 707/100 |
| 2002/0174087 A1 | 11/2002 | Hao et al. | |
| 2003/0061131 A1 | 3/2003 | Parkan, Jr. | |

(Continued)

OTHER PUBLICATIONS

Data warehousing tool's architecture: from multidimensional analysis to data mining Lehn, R.; Lambert, V.; Nachouki, M.-P. Sep. 1-2, 1997 pp. 636-643, IEEE.*

(Continued)

*Primary Examiner*—Wei Zhen
*Assistant Examiner*—Satish S Rampuria
(74) *Attorney, Agent, or Firm*—Anna Linne; Hoffman, Warnick & D'Alessandro

(57) ABSTRACT

A database table of predefined data transformations is provided. Each predefined data transformation is associated in the table with a unique identifier, a corresponding description and a validity period. When a data modeler wishes to develop a data model for a desired prediction, he/she will first determine a set of variables that will be used therefor. The set of variables can include any of the predefined data transformations from the database table. The data model will then be developed by applying raw data to the set of variables and determining a mathematical relationship there between. Once the data model has been developed, the data modeler will write a reusable specification for applying the data model operationally. Thereafter, IT personnel or the like can code and deploy the data model using the specification.

5 Claims, 3 Drawing Sheets

U.S. PATENT DOCUMENTS

| | | | |
|---|---|---|---|
| 2003/0101442 A1* | 5/2003 | Wu | 717/156 |
| 2003/0115211 A1 | 6/2003 | Chen et al. | |
| 2003/0120528 A1 | 6/2003 | Kruk et al. | |
| 2003/0217063 A1* | 11/2003 | Tomic et al. | 707/100 |
| 2004/0117358 A1* | 6/2004 | von Kaenel et al. | 707/3 |
| 2005/0165731 A1* | 7/2005 | Funk | 707/1 |

OTHER PUBLICATIONS

Converting relational database into XML document Fong, J.; Pang, F.; Bloor, C. 2001 pp. 61-65, IEEE.*

Integration of relational databases and record-based legacy systems for populating data warehouses Miller, L.L.; Xin Yu; Nilakanta, S. Jan. 7-10, 2002 pp. 3033-3041, IEEE.*

Data mining: an industrial research perspective, Apte, C., Computational Science and Engineering, IEEE [see also Computing in Science & Engineering], vol. 4 Issue: 2 Apr.-Jun. 1997, IEEE, pp. 6-9.*

A parallel scalable infrastructure for OLAP and data mining, Goil, S.; Choudhary, A., Database Engineering and Applications, 1999. IDEAS '99. International Symposium Proceedings, Aug. 1999, IEEE, pp. 178-186.*

Bottom-up generalization: a data mining solution to privacy protection, Ke Wang; Yu, P.S.; Chakraborty, S.☐☐Data Mining, 2004. ICDM '04. Fourth IEEE International Conference on, Nov. 1-4, 2004, IEEE, pp. 249-256.*

* cited by examiner

FIG. 2

| UNIQUE IDENTIFIER | DESCRIPTION OF DATA TRANSFORMATION | VALID FROM | VALID UNTIL | DATA TRANSFORMATION |
|---|---|---|---|---|
| 0001 | TIME AS A CUSTOMER | 1/1/2003 | 1/1/2008 | NUMBER OF MONTHS FOR FIRST ORDER TO CURRENT MONTH |
| 0002 | AVERAGE PRODUCT PRICE | 5/8/2002 | 5/8/2007 | TOTAL AMOUNT SPENT ON PRODUCTS DIVIDED BY TOTAL NUMBER OF PRODUCTS |
| 0003 | AVERAGE SIZE OF CLAIM | 11/13/2002 | 11/13/2007 | TOTAL AMOUNT OF CLAIMS DIVIDED BY TOTAL NUMBER OF CLAIMS |

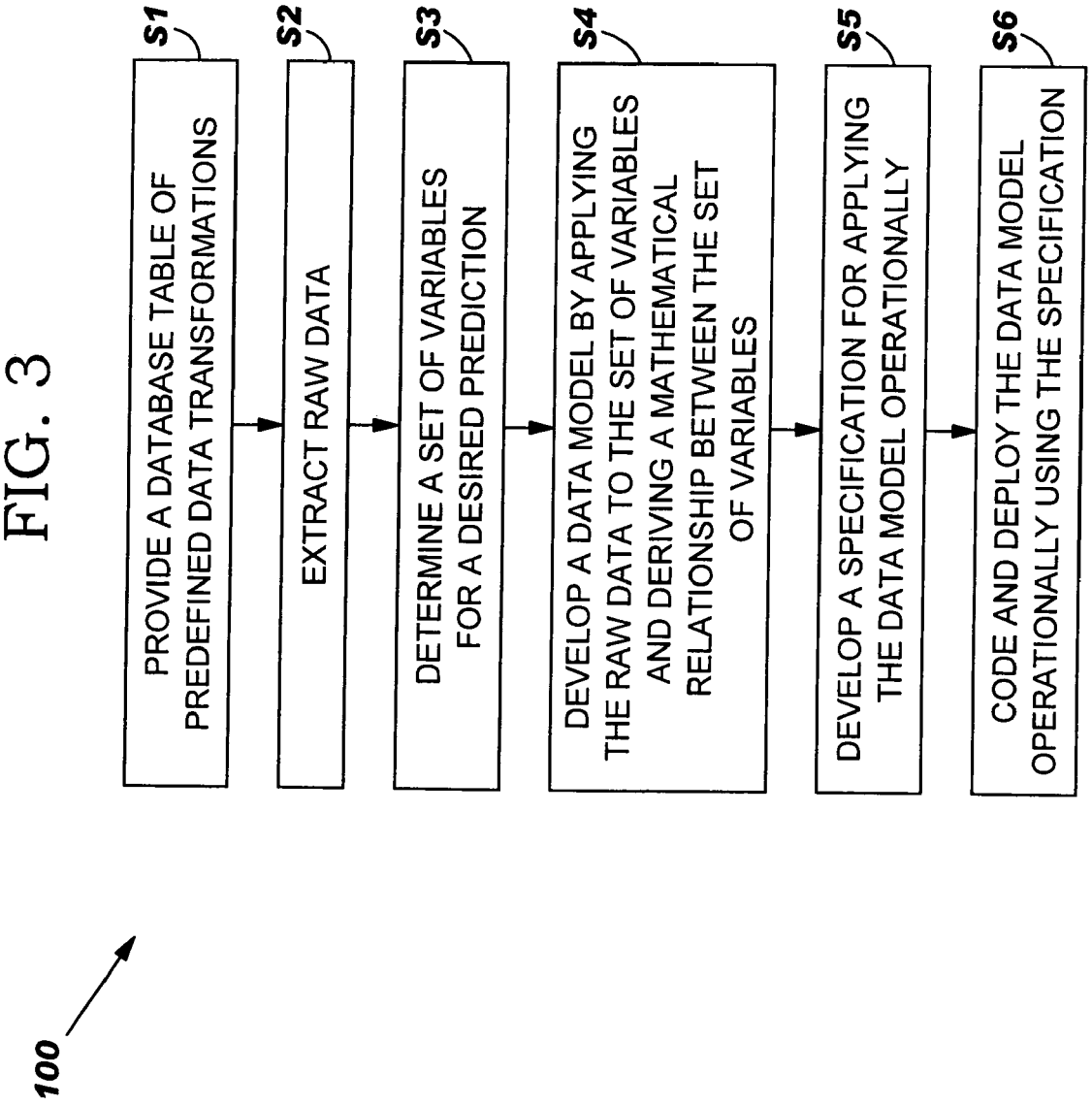

METHOD, SYSTEM AND PROGRAM PRODUCT FOR DEVELOPING A DATA MODEL IN A DATA MINING SYSTEM

BACKGROUND OF THE INVENTION

1. Field of the Invention

The present invention generally relates to a method system and program product for developing a data model in a data mining system. Specifically, the present invention allows a data model to be developed using predefined data transformations stored in a database table.

2. Related Art

In business, the manipulation of data and statistics can be an important tool in achieving optimal levels of efficiency and sales growth. Today, many companies have data modeling groups whose function is to produce mathematical models to be deployed in operational systems. For example, a company may wish to predict the propensity of a current customer to purchase another product offered by the company (i.e., a cross-sale). In such a case, the company's data modeling personnel would attempt to devise a data model that could accurately predict this propensity for existing customers. The current process for modeling data is to: (1) take fairly raw data from the operational systems and/or a data warehouse; (2) apply mathematical transformations and aggregations to the data; and (3) then develop a data model in an iterative fashion. During the process, refinements are made to establish the best transformations to provide the attributes that give the best predictive ability of the resultant model.

Once the data model has been developed, it is usually passed from the data modeler to Information Technology (IT) personnel within the company for application in an operational context. Unfortunately, for a data model to operate in the operational context, each transformation the modeler has undertaken must be repeated identically with the actual operational data. Thus, unless the data model is given the same stimuli in the operational context as during the development process, the data model will likely fail in operation. Moreover, under the current methodology, the data transformations applied to the data during the model development process are written during the development process. That is, when a modeler is attempting to develop a data model, he/she will also write the necessary data transformations. Not only does this lead to pervasive duplication of efforts among data modelers, but it can also lead to differences in data transformations that have the same purpose. Still yet, the current process requires numerous exchanges to occur between the data modelers and the IT personnel for implementation of the data model in the operational context. Often, such exchanges consume weeks or even months. During this time, the company is potentially exposed to lost opportunities and profits. Existing systems that fail to address these problems include U.S. Pat. No. 6,014,670 to Zamanian et al., U.S. Pat. No. 6,339,775 to Zamanian et al. and U.S. Patent Application Publication No. 2002/038450 A1 to Kloppmann et al., all of which are herein incorporated by reference.

In view of the foregoing, there exists a need for a method, system and program product for developing a data model in a data mining system. Specifically, a need exists for a database table that includes predefined data transformations. A further need exists for each predefined data transformation to be associated with a unique identifier, a corresponding description and a validity period. Another need exists for data models to be developed using the predefined data transformations.

SUMMARY OF THE INVENTION

In general, the present invention provides a method, system and program product for developing a data model in a data mining system. Specifically, under the present invention, a database table of predefined data transformations is provided. Each predefined data transformation is associated in the table with a unique identifier, a corresponding description and a validity period. When a data modeler wishes to develop a data model for a desired prediction, he/she will first determine a set of variables that will be used therefor. The set of variables can include any of the predefined data transformations from the database table. The data model will then be developed by applying raw data to the set of variables and determining a mathematical relationship there between. Once the data model has been developed, the data modeler will write a reusable specification for applying the data model operationally. Thereafter, IT personnel or the like can code and deploy the data model using the specification.

A first aspect of the present invention provides a method for developing a data model in a data mining system, comprising: providing a database table of predefined data transformations; providing raw data; developing a data model of variables using at least one data transformation selected from the database table and the raw data; and writing a specification for applying the data model operationally.

A second aspect of the present invention provides a computer-implemented method for developing a data model in a data mining system, comprising: providing a database table of predefined data transformations, wherein each of the predefined data transformations is associated in the database table with a unique identifier and a description; extracting raw data from a data warehouse; determining a set of variables for a desired prediction, wherein the set of variables comprise at least one predefined data transformation selected from the table; developing a data model for the desired prediction by applying the raw data to the set of variables and deriving a mathematical relationship between the set of variables; and writing a specification for applying the data model operationally.

A third aspect of the present invention provides a database table for developing a data model in a data mining system comprising a set of entries, wherein each of the set of entries includes a predefined data transformation, a unique identifier for the predefined data transformation, a description of the predefined data transformation and a validity period for the predefined data transformation.

A fourth aspect of the present invention provides a computerized system for developing a data model in a data mining system, comprising: a database table of predefined data transformations; a data import system for extracting raw data from a data warehouse; a variable determination system for determining a set of variables for a desired prediction, wherein the set of variables comprises at least one predefined data transformation selected from the database table; a model development system for developing a data model for the desired prediction using the determined variables; and a specification development system for developing a specification for applying the data model operationally.

A fifth aspect of the present invention provides a program product stored on a recordable medium for developing a data model in a data mining system, which when executed, comprises:

program code for extracting raw data from a data warehouse;

program code for determining a set of variables for a desired prediction, wherein the set of variables comprises at least one predefined data transformation selected from a database table of predefined data transformations; program code for developing a data model for the desired prediction using the determined variables; and program code for developing a specification for applying the data model operationally.

Therefore, the present invention provides a method, system and program product for developing a data model in a data mining system.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative database table of predefined data transformations according to the present invention.

FIG. 3 depicts a flow diagram of an illustrative method for developing a data model according to the present invention.

Figure 1:
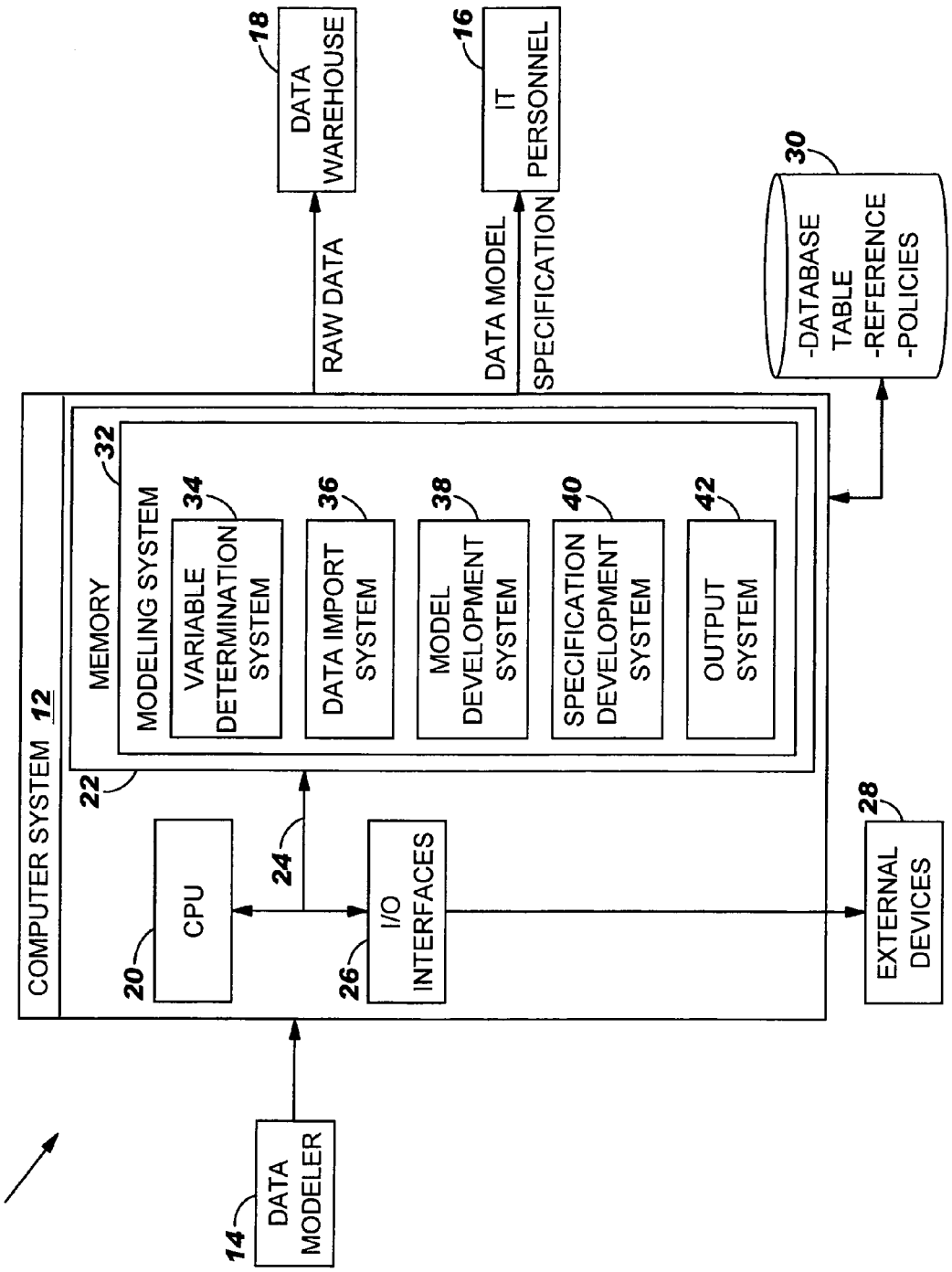
FIG. 1 depicts an illustrative system for developing a data model in a data mining system according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for developing a data model in a data mining system. Specifically, under the present invention, a database table of predefined data transformations is provided. Each predefined data transformation is associated in the table with a unique identifier, a corresponding description and a validity period. When a data modeler wishes to develop a data model for a desired prediction, he/she will first determine a set of variables that will be used therefor. The set of variables can include any of the predefined data transformations from the database table. The data model will then be developed by applying raw data to the set of variables and determining a mathematical relationship there between. Once the data model has been developed, the data modeler will write a reusable specification for applying the data model operationally. Thereafter, IT personnel or the like can code and deploy the data model using the specification.

Referring now to FIG. 1, a system 10 for developing a data model in a data mining system is shown. As depicted, system 10 includes computer system 12, which generally comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, handheld device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., database) capable of providing storage for information under the present invention. Such information could include, for example, a database table of predefined data transformations, a reference for setting forth the needed variables for certain desired predictions, policies such as a data modification policy, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12.

Shown in memory 22 of computer system 12 is modeling system 32 (shown as a program product), which includes variable determination system 34, data import system 36, model development system 38, specification development system 40 and output system 42. As will be further described below, modeling system 32 allows data modeler 14 to develop data models using predefined data transformations. Specifically, under the present invention, predefined data transformations are provided in a database table (e.g., as stored in storage unit 30). As known in the art, data transformations are formulae for mathematically manipulating (raw) data. However, as being "predefined" under the present invention, the data transformations are developed in advance of developing a data model. As such, the predefined data transformations allow all data modelers to use the same data transformations without duplicating effort.

Referring to FIG. 2, an illustrative database table 50 is shown in greater detail. As depicted, table 50 includes entries 52A-C. Each entry 52A-C includes a data transformation 62 that is associated with a unique identifier 54, a description of data transformation 56 and a validity period as established by start date valid from 58 and termination date valid until 60. As will be further described below, unique identifiers 54 allow model developer 14 (FIG. 1) to include a predefined data transformation 62 in a data model by simply referring to its corresponding unique identifier 54. The data transformations 62 shown in FIG. 2 are intended to be illustrative only and it should be appreciated that table 50 is not limited to those shown.

In any event, data transformations 62 are intended to correspond to a specific example that will be used herein to describe the model development process of the present invention. Specifically, data transformations 62 are intended to correspond to a desired prediction that a current mortgage customer of a banking and insurance company will be a likely and/or good candidate to purchase life insurance from the company. For example, entry 52A includes a data transformation identified by unique identifier "0001" that is for computing the time that the individual has been a customer of the company. As can be seen, this would be computed by calculating the number of months from the first order placed by the individual to the current month. Entry 52B includes a data transformation identified by unique identifier "0002" that is for computing the average product price of products purchased by the individual. This would be calculated by dividing the total amount spent on products by the total number of products purchased. Still yet, entry 52C contains a data transformation identified by unique identifier "0003" that is for determining the average size of any claims made by the individual. This would be calculated by dividing the total financial amount of claims by the total number of claims made by the individual. Each of these transformations can be used by data modeler 14 only during the time period set between start date 58 and termination date 60. It should be appreciated that in a typical embodiment, data transformations 62 will be represented in table 50 using SQL expressions. This allows the database system to execute data transformations 62 inline for direct deployment (e.g., without the need for coded transformations, or loading transformed data into the operational system). Data transformations 62 are shown in English for clarity purposes only.

One purpose for providing predefined data transformations 62 in table 50 is so that model developers will use the same data transformations when developing data models. As such, the editing of table 50 should be closely controlled (e.g., limited to data modelers or other authorized personnel). To this extent, one or more policies (e.g., a modification policy) could be associated with table 50 that govern the modification of predefined data transformations 62 as well as the addition or deletion thereof. It should also be appreciated that predefined data transformations 62 can be abstracted so that models can be deployed directly without the need for coded transformations, or loading transformed data unit the operational system.

Referring back to FIG. 1, assume that data modeler 14 wishes to develop a data model that will predict the propensity of a particular mortgage customer to be cross-sold on a life insurance policy (hereinafter referred to as a "desired prediction"). The first step would be for data modeler to determine a set (e.g., one or more) of variables that would be used in the data model. It could be the case that the set of variables not only includes at least one predefined data transformation selected from table 50 (FIG. 2), but also variables that do not require manipulation of statistics. For example, data modeler 14 might decide that making this desired prediction will include the non-transformation-based variables of:

(1) whether the individual purchased the mortgage on a discount;
(2) the number of other products the individual has purchased from the company; and
(3) the number of members in the individual's household.

Data modeler 14 might further determine that the desired prediction further requires the following transformation based variables:

(4) the time the individual has been a customer;
(5) the average product price for the individual; and
(6) the average size of any claims filed by the individual.

These variables can be set forth by data modeler 14 using variable determination system 34. To this extent, variable determination system 34 could provide one or more interface pages for selecting or designating the variables. For example, the variables could be selected from a drop-down menu or the like. Moreover, the transformation-based variables could be selected based on their corresponding unique identifiers. In another embodiment, variable determination system 34 can be a smart system that includes logic for determining the variables for the desired prediction. In this case, variable determination system 34 could present data modeler with one or more interface pages for selecting or designating a particular desired prediction. Based on the desired prediction, variable determination system 34 could then access a reference (e.g., in storage unit 30) that sets forth the needed variables. Variable determination system 34 could then retrieve any needed predefined data transformations from table 50 by referencing the corresponding unique identifiers.

In any event, in order the develop the data model, raw data will be needed. To this extent data import system 36 is shown. Typically, the raw data will be extracted from data warehouse 18 or the like. However, it should be understood that raw data could be provided/received in any manner now known or later developed. In any event, once raw data is available, model development system 38 will be used to develop the data model. Specifically, the raw data will be applied to the set of variables 1-6 set forth above. Applying the raw data to the non-transformation-based variables requires simply applying the corresponding data. That is no mathematical manipulation of the raw data is required. Accordingly, the variable of whether the individual purchased the mortgage on a discount simply requires making this determination (e.g., a yes or no answer). Similarly, the number of other products the individual has purchased from the company and the number of members in the individual's household can be determined by analyzing the raw data and determining the particular values.

Conversely, for the transformation-based variables, mathematical manipulation of the raw data will be performed according to the predefined data transformations. For example, to determine the amount of time the individual has been a customer of the company, model development system 38 will compute the number of months from the individual's first order to the current month. To computer the average product size of the individual, model development system 38 will divide the total amount spent on products by the individual by the total number of products purchased by him/her. Furthermore, to computer the average size of claim made by the individual, model development system 38 will divide the total financial amount of claims by the total number of claims made by the individual.

Assume for variables 1-6, the following results were determined:

(1) Mortgage not purchased on a discount;
(2) 2 other products purchased by the individual;
(3) 4 members in household;
(4) 19 Months as a current customer=(current date of Jun. 1, 2003)−(first date of Nov. 1, 2001);
(5) $450.00 average spent per product=$900.00/2 products; and
(6) $0.00 average claim value (no claims made)=$0.00/0.

Once the raw data has been applied to the variables in this manner, model development system 38 would then determine a mathematical relationship between the values so that a composite score could be determined that would answer the desired prediction. Specifically, model development system 38 would weight (or be used by data modeler 14 to weight) each of the six variables and determine the mathematical relationship there between. In weighting the set of variables, data modeler 14 could use his/her own expertise, or model development system 38 could be a smart system that accesses a resource of formulae that provides the needed weightings. Regardless, assume the following exemplary weightings and mathematical relationships between the six variables were determined:

0.4(variable 1)+0.1(variable 2)−0.7(variable 3)+0.5 (variable 4)+1.4(variable 5)−0.25(variable 6)

It should be understood that the above data model is intended to be illustrative only. As such, the mathematical relationships and weightings are not intended to be specifically illustrative of those that might actually be used for the example desired prediction set forth herein. In addition, it should be understood that model development system 38 could assign numeric values to "yes" or "no" questions. For example, the variable pertaining to whether the individual had purchased a mortgage on a discount could be provided by a value representing the actual discount received. If no discount was received, that value could be $0.00.

In such a case, the data model would appear as follows:

0.4(0)+0.1(2)−0.7(4)+0.5(19)+1.4(450)−0.25(0)

and lead to a composite score of:

0+0.02−2.8+9.5+630−0=636.72

Once the data model has been completely developed, specification development system 40 will write or be used to write a specification for applying the data model operationally. Specifically, as known, in order for a data model to be successfully applied in an operation contest, the same stimuli experienced during development should be experienced operationally. In the past, this required a lot of back and forth communication between IT personnel 16 and data modeler 14. However, under the present invention, the specification is a set of instructions that explains precisely how the data model should be applied operationally. This should avoid the need for follow up communication between IT personnel 16 and data modeler 14. Moreover, the specification is reusable under the present invention so that future duplication of effort can be avoided (just as the case with data model development under the present invention). Regardless, once the specification has been written, it will be communicated to IT personnel along with the data model for coding and deployment operationally.

It should be understood that the teachings described herein could be implemented on a stand-alone computer system 12 as shown in FIG. 1, or over a network in a client-server environment. In the case of the latter, the client and server could communicate over any type of network such as the Internet, a local area network (LAN), a wide area network (WAN), a virtual private network (VPN), etc. As such, communication between the client and server could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the client could utilize an Internet service provider to establish connectivity to the server. These concepts also apply to communication between data modeler 14, IT personnel 16 and data warehouse 18.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 3, a method flow diagram 100 according to the present invention is shown. As shown, first step S1 is to provide a database table of predefined data transformations. As indicated above each of the predefmed data transfonnations is associated in the database table with a unique identifier, a description and a validity period. Second step S2 is to extract raw data from a data warehouse. Third step S3 is to detenxiine a set of variables for a desired prediction. Under the present invention, the variables can include at least one predefined data transformation selected from the table. Fourth step S4 is to develop a data model for the desired prediction by applying the raw data to the set of variables, and deriving a mathematical relationship between the set of variables. Fifth step S5 is to write a specification for application for applying the data model operationally. Sixth step S6 is then to code and deploy the data model operationally using the specification.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of modeling system 32 shown in FIG. 1 is not intended to be limiting. That is, the functions of the present invention described herein could be represented by a different configuration of systems.

We claim:

1. A method for developing a data model in a data mining system, comprising:
providing a database table of user predefined data transformations, the data
transformations in the database table being reusable by a plurality of data models; providing raw data from a data mining operation;
developing a data model of variables using at least one data transformation selected from the database table and the raw data; and
writing a specification for applying the data model operationally, wherein the step of writing a specification comprises writing a reusable set of instructions for applying the data model operationally, wherein the database table of predefined data transformations associates each of the predefined data transformations with a unique identifier, a description and a validity period and wherein the developing step comprises retrieving the at least one predefined data transformation from the database table according to its unique identifier;

wherein the developing step includes determining a set of variables for a desired prediction, wherein the set of variables include at least one predefined data transformation selected from the database table; and deriving a mathematical relationship between the set of variables.

2. The method of claim 1, farther comprising coding and deploying the data model using the specification.

3. The method of claim 1, wherein the developing step further comprises applying the raw data to the set of variables.

4. The method of claim 1, wherein the step of providing raw data comprises extracting raw data from a data warehouse.

5. The system of claim 1, further comprising a modification policy that governs modification of the predefined data transformations in the database table.

* * * * *